Patented Oct. 1, 1935

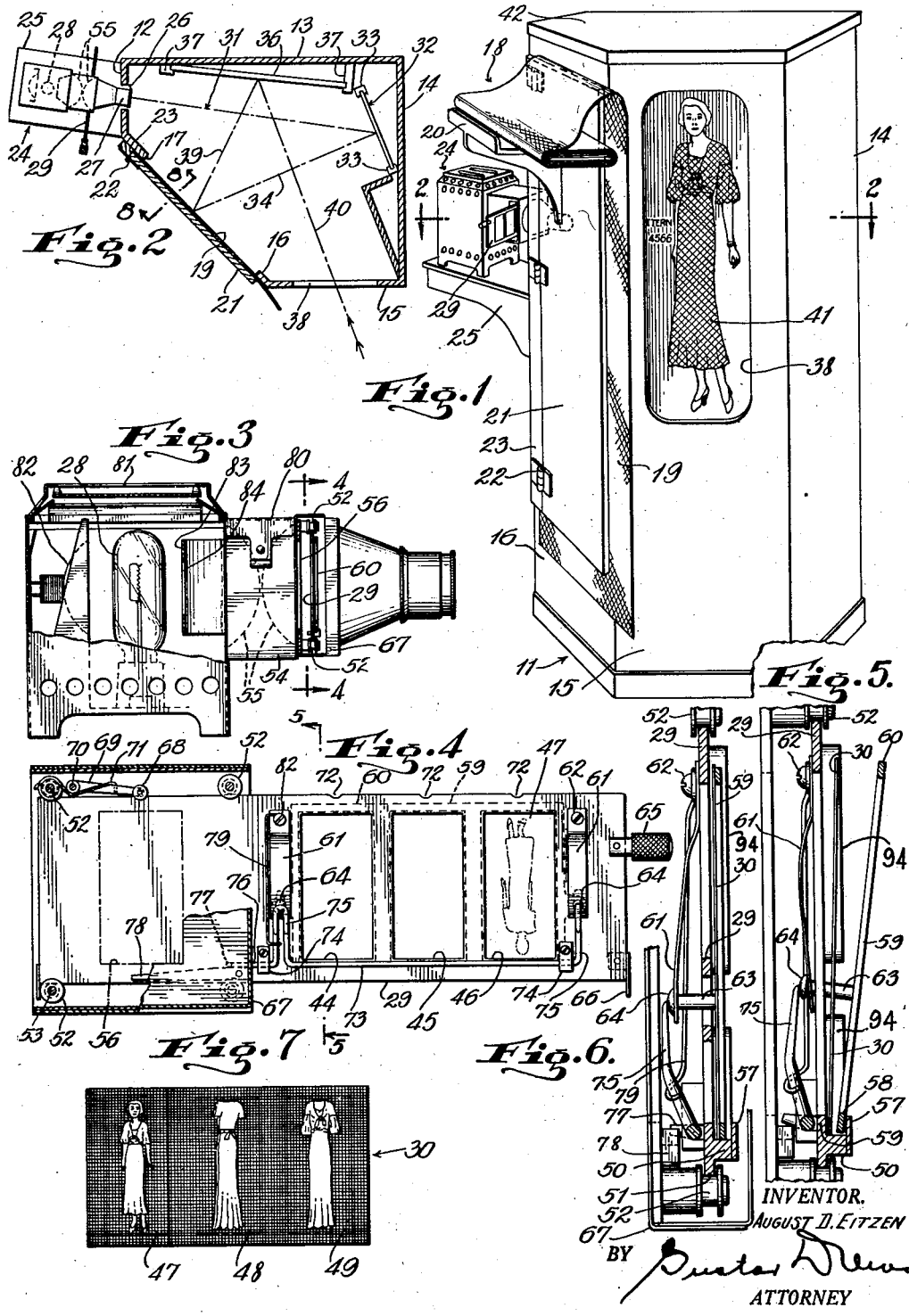

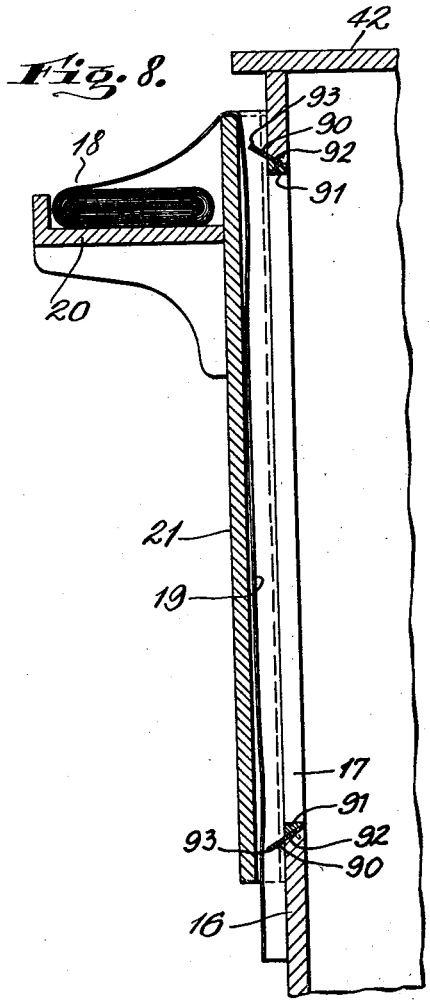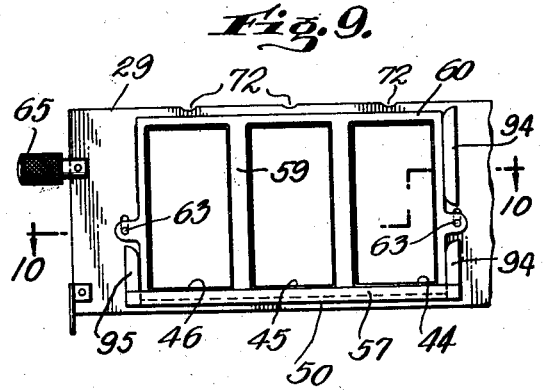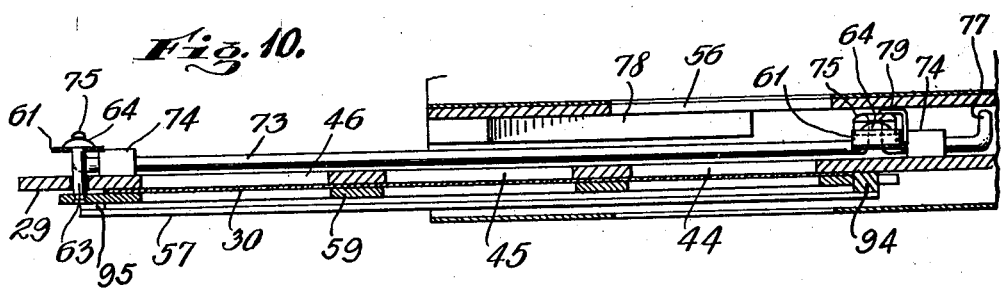

2,015,665

UNITED STATES PATENT OFFICE 2,015,665

DISPLAY DEVICE

August D. Eitzen, Rockville Centre, N. Y., assignor to Simplex Pattern Projection Corporation, New York, N. Y., a corporation of Delaware Application August 19, 1932, Serial No. 629,422

12 Claims. (Cl. 88—24)

The present invention relates to display apparatus of the visualizer type, having for its general object to enable a person to determine how a certain object will appear when made of material of a certain pattern.

In an earlier application, Serial No. 545,814, filed by the present applicant as joint inventor with Bernard F. Stenz, an apparatus is disclosed for accomplishing the above general object, said earlier apparatus comprising a projector and a screen (the latter displaying on its receiving surface the pattern material in full size) and a miniature transparent outline picture or image producing device is introduced between the projector and the screen so that the picture is projected in full size or magnified form toward the patterned material on the screen, the pattern material thereon cooperating and combining with the projected image to show the object as though it were made of material of that particular pattern, for instance a picture of a woman's dress or gown.

The apparatus of said application comprises also a cabinet in which the instrumentalities already mentioned are combined or associated with a mirror in which a reflected reproduction of the combined image may be viewed through a suitable aperture in the cabinet.

The above disclosed apparatus affords a suitable means for accomplishing the intended purpose, and the present invention has for its particular object an improved apparatus for effecting the operation above disclosed and in which the various instrumentalities are arranged in considerably more compact form so as to be adapted for use in the somewhat confined spaces available for such apparatus in places like department stores, for the purpose of demonstrating to customers the appearance of various patterns when made up into dresses, or for similar demonstrations.

Another object of the present invention is to provide an improved form of projector with an image producing device adapted to enable an operator to show in combination with the pattern material several aspects of a dress or similar object made of material of a given pattern by relatively simple manipulation of the image producing device.

A cognate object of the invention is to provide such a projector with a sliding frame constituting means for receiving and presenting a negative having several divisions, each adapted to present one aspect of the dress or other object to be shown in combination with the pattern, said sliding frame having gripping means for the negative so operable by a simple sliding movement of the frame that when the frame is drawn outwardly from the projector the gripping means are automatically released to permit introduction of the negative or ready withdrawal therefrom, and after a negative has been dropped into the frame, a simple inward sliding movement automatically causes the gripping means to engage the negative and hold it firmly in proper position for projection therethrough of the light beam which carries successively each of the different images as the latter are respectively brought into position in the path of the beam of light.

A further object of the invention is to arrange the various elements so that the projector and pattern screen material will be in such close proximity that the operator can stand in one position, out of the way of the visualizing aperture and manipulate the slide carrying the image producing device and also manipulate the pattern material, adjusting and changing the same from time to time in the course of a demonstration to the customer.

Still another object is to provide means for automatically stretching the pattern screen material flat and so holding it as to present a surface free from wrinkles to receive the projected image of the design for a dress, or like object to be displayed.

The above and other features of the invention are illustrated and described fully in the accompanying drawings and specification and are pointed out in the claims. In the drawings Figure 1 is a view in elevation of a cabinet with which are associated in operative combination a projector embodying the invention and means for holding successively different bolts of material having the different designs to be displayed;

Fig. 2 is a view in horizontal section on the line 2—2 of Fig. 1;

Fig. 3 is a view in side elevation, partly in section of the projector shown in Fig. 1, upon an enlarged scale;

Fig. 4 is a vertical section on the line 4—4 of Fig. 3.

Fig. 5 is an enlarged detailed view in vertical section taken upon the line 5—5 of Fig. 4;

Fig. 6 is a view similar to Fig. 5 showing the parts in a different position;

Fig. 7 is a plan view of a negative adapted to be used as the image producing device in the slide as shown in Fig. 4.

Fig. 8 is a view in vertical section on the line 8—8 of Fig. 2 upon a larger scale;

Fig. 9 is a fragmental view in elevation of the slide, taken from the side opposite to that shown in Fig. 4;

Fig. 10 is a view in vertical section, taken on the line 10—10 of Fig. 9, upon a larger scale.

An illustrative embodiment of apparatus adapted to carry the invention into effect is shown in the drawings in which the reference character 11 designates generally a housing or cabinet which is preferably upright in its longest dimension and may be of any suitable material, size and contour.

Preferably, it is, as illustrated, substantially pentagonal in horizontal cross-section, as best seen in Fig. 2, four of the sides, namely those designated 12, 13, 14, and 15 being disposed in rectangular relation to each other, constituting a quadrilateral body portion, while the fifth side, that designated 16, is inclined relatively to the quadrilateral body.

This inclined side pursuant to the invention is provided with an aperture 17 which may extend substantially the entire width of this side and constitutes an aperture over which may be draped part of a bolt of cloth, such as that shown at 18 in Fig. 1, the free end 19 of this bolt furnishing one example of pattern material adapted to serve as a pattern screen for display purposes.

A shelf 20 serves as one convenient form of support for such a bolt and this bracket may conveniently be carried upon a swinging door 21 hinged at 22 upon the jam 23 of the screen aperture, so that when thus supported the material 19 will be held flat across the screen aperture as shown clearly in Fig. 2.

Referring to Fig. 8, a flap 90 of suitable material, such as rubber, is fastened by a strip 91 upon the bevelled edge 92.

At the bottom of the screen aperture 17, and by another strip 91 at the top, preferably, so that when the door 21 is closed the free edge 93 of each of these flaps is engaged with the inner face of the pattern material 19, and these edges 93 act upon the pattern material in such a way as to stretch it automatically lengthwise of the aperture, thus presenting a smooth, flat surface to receive the image projected thereon.

Any vertical wrinkles can be readily removed by the operator, who simply pulls the outer vertical margin of the strip 19 outwardly, the inner vertical edge thereof, adjacent to the hinges 22, being clamped between the inner face of the door and the jamb 23.

In further pursuance of the invention, a projector designated generally by the reference character 24 is supported upon a shelf or bracket 25 in a position closely adjacent to the wall 12, which has a light aperture 26 adapted to receive the objective lens carrying end 27 of the projector so that a beam of light originating with a lamp 28 in the projector will be projected across the cabinet toward the side wall 14 thereof.

The projector is provided with an image producing device which will be described more at length hereinafter and which preferably takes the form of a slide 29 in which is mounted a negative generally designated by the reference number 30 and best seen in Fig. 7.

It will be understood readily by those skilled in the art that the projector 24, thus disposed, is adapted to produce, in combination with the negative 30, a beam of light 31 carrying an enlarged reproduction of the image or images upon the negative 30, and in the instance illustrated, this light beam 31, in pursuance of one object of the present invention is directed toward and impinges upon, reflecting means 32 which may be a mirror supported suitably in a frame 33 secured to the wall 14 of the cabinet at a region thereof in the path of the light beam 31 and adapted to deflect the portion 34 of the light beam toward the screen material 19, it being understood that the enlargement of the image carried by the beam continues until it impinges upon the pattern screen material 19, advantage thus being taken of the combined length of the beam portions 31 and 34 to produce upon the pattern screen 19 an image which may approximate as closely as desired the proportions of the pattern upon the material 19, so that this combined image and the pattern are suitably proportioned relative to each other to yield a lifelike effect when viewed either directly, or preferably, in another mirror or reflector suitably arranged for that purpose.

In the instance illustrated, this secondary reflector 36 is mounted at 37 in a frame secured to the inner surface of the wall 13 in a suitable angular position to be observed through a visualizing opening 38 which is formed in the wall 15 to permit inspection, from the outside, of said combined enlarged image, upon said secondary mirror 36. This reflection of the image carrying beam follows lines 39, 40 in Fig. 2 and the effect secured is that clearly shown at 41 in Fig. 1.

It is to be observed that an operator standing near the projector can readily operate the slide 29, and without leaving his position can open the door 21 and remove the bolt 18 of material and then will place another over the screen aperture, also without leaving his position, the cabinet top 42 serving as a convenient place to pile various bolts of material for such use.

In pursuance of another important object of the invention, the projector is provided with an improved means for holding the image producing device, represented in the instance illustrated by the negative 30, the preferred form of holding means comprising the slide 29 to which reference has already been made and which, in its preferred form comprises an elongated strip of sheet metal having formed therein as many openings, for example those designated respectively 44, 45, and 46, as may be desirable to permit the operator to exhibit various aspects of the object intended to be displayed.

In the instance illustrated, there are three of these openings opposite to the three divisions 47, 48, and 49 respectively in the negative 30, it being understood that in Fig. 6 the negative is shown there in a position which is reversed both top and bottom and end for end when the negative is associated with the slide 29, this being indicated in Fig. 4 where the portion 47 appears in reverse position at the right hand end of the slide, opposite the opening 46.

The slide 29 as best shown in Figs. 5 and 6 is provided with a ledge 50 adjacent the lower edge of the slide, the latter edge 51 being adapted to run upon anti-friction rollers 52 mounted upon studs 53 extending forward from an extension housing 54 in which are mounted suitable condenser lenses 55 interposed between the lamp 28 and the light aperture 56 of the projector, this light aperture being shown in dash and dot lines in Fig. 4.

The forward edge of the ledge 50 is guarded by a flange or abutment 57, best seen in Figs. 5 and 6, and which is sufficiently spaced from the body portion 29 of the slide to afford room not only for the lower edge of the negative 30 but also affords space to receive the lower edge 58 of a gate or gripping member 59, which, as shown in dotted lines in Fig. 4, is approximately co-extensive in length with that portion of the slide in which are formed the apertures 44, 45, and 46, the gripping member having three apertures adapted to register with those last named.

The gripping member 59 is adapted to rock toward and away from the slide 29 under the control of means now to be described, which in accordance with another object of the invention, serve to position the gripping member automatically in an open position as shown clearly in Fig. 5 in which its lower edge 58 is closely adjacent to the guard 57 leaving a considerable space between the edge 58 and the portion 59 of the slide 29 constituting the lower margin of the frame openings 44, 45, and 46. The upper edge 60 of the gate or gripping member 59 in this position is inclined outwardly to provide a large V-shaped opening into which the operator can drop the negative 30 without any special effort, so that the negative 30 of its own weight will drop into the position shown in Fig. 5 ready to be clamped by an inward movement of the gripping member 59 which is effected by suitable means, the preferred form of which will now be described.

As one convenient form of means to effect this gripping action, I have provided a pair of springs 61, one secured by a screw 62 set into the slide 29 at each end of the part containing the openings 44, 45 and 46 (see Fig. 4), each of these flat springs having at its lower end an opening which is transfixed by a post 63 fixed in the gripping member 59 and having its head 64 engaged with the spring 61, the tendency of the spring being to draw the gripping member 59 toward the slide 29, first rocking it upon its lower edge 58 and then drawing the body forward into the erect position shown in Fig. 6, in which position the negative 30 is held flat against the slide 29 so that sharply defined projection is secured when the beam of light is projected through the negative. It is understood of course that the gripping member 59 occupies the position shown in Fig. 5 when the slide 29 is in its outermost position shown in Fig. 4. This is the normal inoperative position of the slide ready for use, and in the operation of the apparatus, after dropping the negative 30 in place, the operator will grasp the handle 65 and push the slide lengthwise inwardly until the slide opening 44 registers with the light aperture 56 of the projector, when the film section 49 will be in a position, in the path of the light beam, to have its miniature outline picture of a gown projected in enlarged form against the mirror 32 and thence reflected against the screen material 19 in such enlarged form as to be in suitable proportion to enable an observer looking along the line 40 to view in the mirror 36, an approximately life-size picture of the gown with the pattern imposed thereon.

Then, the frame may be moved in the same direction until the frame aperture 45 is brought into registry with the light aperture 56 of the projector with the result that the image upon section 48 of the film 30 will be similarly projected, showing in this instance the back of the woman's dress, the front of which has already been viewed by the observer.

Then by a similar advancing of the slide toward the left, the slide aperture 46 and film image 47 will be brought into position for projection of the last named image, which is that shown in Fig. 1, being a view of a person wearing a shorter dress with the pattern superimposed thereupon.

The slide may be provided desirably with a suitable stop 66 for engagement with the extension housing at 67, thus limiting the inward movement of the slide, and means are preferably provided to facilitate proper registration of each of the slide apertures 44, 45, and 46, in turn, with the light aperture 56 as already described.

One convenient form of registering device is that shown at 68 in Fig. 4, comprising a roller mounted at the free end of a lever 69 mounted pivotally at 70 upon the extension housing and urged by a spring 71 toward the upper margin of the slide which has notches 72 suitably disposed to be entered yieldingly by the roller 68 when the center of each aperture comes opposite the roller 68.

After display of the several images, the slide may be withdrawn into the normal inoperative position shown in Fig. 4 by grasping the handle 65 and pulling the slide outwardly lengthwise.

During the inward movement of the slide, the film 30 has been held as already described, by the gate or gripping member 59 up against the slide 29 and this position persists throughout the inward and outward movement of the slide, until, in its outward movement, the slide reaches at least a position where the gripping member 60 is clear of the extension housing 67.

In pursuance of a further object of the invention, the gripping member is then preferably moved outward automatically in a positive manner by means now to be described, such means constituting an illustrative form of device suitable for the purpose.

Referring to Figs. 4, 5, and 6 respectively, a rock shaft 73 is mounted in bearings 74 in position to extend lengthwise of the slide below the openings 44, 45, and 46, and this rock shaft has upwardly extending arms 75, the free ends of which are suitably disposed to bear against the heads 64 of the studs 63 carried by the gripping member 59. This rock shaft 73 has an extension 76, at the end of which is a finger 77 adapted to engage a cam 78 mounted adjacent to the light aperture 56 of the projector and having its upper face inclined outwardly and upwardly toward the wall 67 of the extension housing.

As the slide 29 is drawn outwardly, the finger 77 rides up upon the cam 78 and rocks the shaft 73 so that the arms 75 are turned against the heads 64 of the studs 63 and gradually force the member 59 outwardly into the position shown in Fig. 5, in which position as already described in detail, the lower edge 59 of the gripping member is in its outermost position against the guard abutment 57 and the upper end 60 of the gripping member is sufficiently removed from the upper edge of the member 59 to give ample space for insertion and withdrawal of the negative 30.

It will be observed that this outward movement of the gripping member is effected positively, against the action of the springs 61, and the gripping member is maintained in its open position as long as the slide 29 occupies the outer inoperative position shown in Fig. 4.

The arm 75 may desirably be held in engagement with the heads 64 of the studs 63 by a spring 79, the latter being conveniently mounted upon the slide 29 by means of one of the screws 62 which secure the flat springs 61 to the slide.

The spring 79 need not be very strong in its action, as it merely serves to prevent any loose motion of the arms 75 when the slide is in its inward position, where the finger 77 is out of engagement with the cam 78 and unless prevented by some such means as the spring 79, the rock shaft might rotate to such an extent that the arms 75 would interfere with the movement of the slide by reason of casual engagement with parts of the extension housing.

The structure of the projector 24, in general, may be of any suitable character and it is herein shown as provided with suitable cover members 80 and 81 which respectively afford convenient access to the extension housing and to the main housing. As already indicated, the main housing encloses the lamp 28 and is provided preferably with a reflector 82 and with a shield member 83 which has an opening 84 adapted to pass only sufficient light to produce the light beam for projection of the image.

The shield 83 serves to cut off a considerable amount of radiant heat from the condenser lenses 55 and film 30, radiating the heat by reason of its sheet metal structure.

It will be understood, however, that any suitable form of projector may be used in connection with the cabinet hereinabove described.

This cabinet, as will be understood from the foregoing description, constitutes a very compact form of apparatus for producing the intended display effects, the desirable length of light beam for producing the necessary enlargement of the image projected from the miniature picture used on film 30 being secured by deflection of the beam 31 by a reflecting device within the cabinet instead of by setting the projector away from the cabinet proper at a distance sufficient to permit direct projection of the image against the pattern screen 19, as in the former joint application, Serial No. 545,814, hereinbefore mentioned.

It will of course be understood that while the reflecting device illustrated consists of a single mirror 32, this mirror might be desirably replaced by any system of mirrors adapted to cooperate with the projector and screen to produce thereon an image of any suitable enlarged proportions.

When the inner end of the slide is opposite the light aperture 56 of the projector, the light beam is cut off, and the interior of the cabinet is in absolute darkness until the operator is ready to give a demonstration by pushing the slide inward after the negative 30 has been put in place.

In Figs. 9 and 10, I have shown in detail a means for aiding to position the negative 30 correctly when it is dropped upon the ledge 50, between the body 29 of the slide and the gate 59.

The means illustrated comprises an upright shoulder or abument 94 formed at the inner end of the body 29 of the slide, and a similar abutment 95 formed at the outer end thereof, the latter abutment being somewhat shorter than the first mentioned abutment, so that the negative can be readily engaged first with the higher abutment, and then dropped down, being guided into position by the abutments without special effort on the part of the operator.

It is obvious that various changes and modifications may be made in the details of construction without departing from the general spirit of the invention as set forth in the appended claims.

I claim:

1. In a projector having as elements, upon a support, a light source, a condenser lens, a light aperture, and an objective lens, said elements being alined with the optical axis of projection and adapted to cooperate in the projection of a light beam transmitting an enlarged reproduction of a miniature picture interposed in the path of said light beam along said optical axis, a picture holding device comprising a slide characterized by having an aperture adapted to be brought into registry with said light aperture by lengthwise movement of said slide, picture-supporting means upon said slide, a tilting apertured gripping member or gate extended along said slide, means adapted to urge said gate yieldingly toward the body of said slide to hold said picture firmly in place for purposes of projection, and means adapted to act automatically to move said gripping member away from said slide-body for reception of said picture.

2. In a projector having as elements, in combination upon a supporting structure, a light source, a condenser lens, a light aperture, and an objective lens, said elements being alined with the optical axis of projection and adapted to cooperate in the projection of a light beam transmitting an enlarged reproduction of a miniature picture interposed in the path of said light beam along said optical axis, a picture-holding device comprising a slide characterized by having a plurality of apertures adapted to be brought alternately into registry with said light aperture by lengthwise movement of said slide, picture-supporting means upon said slide, a tilting apertured gate extended along said slide, means adapted to urge said gate yieldingly toward the body of said slide to hold said picture firmly in place for purposes of projection, and means adapted to act automatically to move said gate bodily away from said slide-body, against the action of said yielding means.

3. In a projector having as elements, in combination upon a supporting structure, a light source, a condenser lens, a light aperture, and an objective lens, said elements being alined with the optical axis of projection and adapted to cooperate in the projection of a light beam transmitting an enlarged reproduction of a miniature picture interposed in the path of said light beam along said optical axis, a picture-holding device comprising a slide characterized by having an aperture adapted to be brought into registry with said light aperture by lengthwise movement of said slide, and picture-holding means upon said slide comprising a ledge, along one face of the slide below said apertures, and upon which the lower edge of the picture may rest, a tilting apertured gate extended along said ledge, means adapted to urge said gate yieldingly toward the body of said slide to hold said picture firmly in place for purposes of projection, and means adapted to act automatically to move said gate bodily away from said slide-body, and to tilt said gate around its bottom edge supported by said ledge, to create a V-shaped opening between said slide-body and ledge for reception of said negative.

4. A projector characterized by elements combined as set forth in claim 3, and further characterized by gate-actuating means comprising a rock-shaft supported in bearings upon said slide and extending lengthwise along the lower margin of the slide below the level of said body apertures, said rock-shaft having arms adapted to be engaged with projections upon said gate and acting when said rock-shaft is rotated to move said gate bodily outward from said slide-body and to tilt said gripping member to form said V-shaped opening.

5. A projector characterized by elements combined as set forth in claim 3, and further characterized by gate-actuating means comprising a rock-shaft supported in bearings upon said slide and extending lengthwise along the lower margin of the slide below the level of said body apertures, said rock-shaft having arms adapted to be engaged with said gate and acting when said rock-shaft is rotated to move said gate bodily outward from said slide-body and to tilt said gripping member to form said V-shaped opening.

6. A projector characterized by elements combined as set forth in claim 3, and further characterized by gate-actuating means comprising a rock-shaft supported in bearings upon said slide and extending lengthwise along the lower margin of the slide below the level of said body apertures, said rock-shaft having arms adapted to be engaged with projections upon said gate and acting when said rock-shaft is rotated to move said gate bodily outward from said slide-body and to tilt said gripping member to form said V-shaped opening, said rock-shaft having a finger extending transversely relatively to the path of slide movement, and a cam mounted upon said supporting structure adjacent to said slide and adapted to be engaged by said finger to cause rocking movement of said shaft to open said gripping member, said cam acting positively to maintain said gate open against the action of said yielding means.

7. A picture-holding slide for a projector, said slide comprising an apertured body portion having a picture-supporting ledge and abutment extending along the lower portion of one face, an apertured gate disposed with its lower edge extended along said ledge within said abutment and having one or more headed posts arranged to project through said slide-body, and a spring interposed between the opposite face of said slide-body and the head of each post and tending to urge said gate yieldingly toward said slide-body, whereby said gate is adapted to hold said picture firmly against said slide-body, and is also adapted to be moved away from said slide-body to permit ready insertion of said picture therebetween, and withdrawal therefrom.

8. The combination with a projector including a housing provided with a light aperture, of a picture holding slide as in claim 7, and adapted to be reciprocated lengthwise past said light aperture, said slide being further characterized by a rock-shaft having an arm to engage each of said post-heads, and having a finger extending away from the axis of said rock-shaft, and said housing having a cam adapted to be engaged with said finger when said slide is moved past said light aperture, said cam and finger cooperating to rock said shaft and cause said arm to open said gate positively, against the action of said spring, when said gate has been carried out of said housing by outward movement of said slide.

9. A picture-holding slide for a projector, said slide comprising an apertured body portion having a picture-supporting ledge and abutment extending along the lower portion of one face, an apertured gate disposed with its lower edge extended along said ledge within said abutment and having one or more headed posts arranged to project through said slide-body, a spring interposed between the opposite face of said slide-body and the head of each post and tending to urge said gate yieldingly toward said slide-body, whereby said gate is adapted to hold said picture firmly against said slide-body and is also adapted to be moved away from said slide-body to permit ready insertion of said picture therebetween and withdrawal therefrom, said slide being adapted to be reciprocated lengthwise past said light aperture and being further characterized by a rock-shaft having an arm to engage each of said post-heads, and having a finger extending away from the axis of said rock-shaft, and said housing having a cam adapted to be engaged with said finger when said slide is moved past said light aperture, said cam and finger cooperating to rock said shaft and cause said arm to open said gate positively, against the action of said spring, when said gate has been carried out of said housing by outward movement of said slide, said projector housing having a slideway adjacent to said light aperture, and said slide having a spring adapted to cause rotation of said rock-shaft to bias said arms toward said slide, whereby casual contact of said arms with portions of said housing adjacent to the slideway is prevented when said finger is not engaged with said cam.

10. A picture-holding slide for a projector, said slide comprising an apertured body portion having a picture-supporting ledge and abutment extending along the lower portion of one face, an apertured gate disposed with its lower edge extended along said ledge within said abutment and having one or more headed posts arranged to project through said slide-body, a spring interposed between the opposite face of said slide-body and the head of each post and tending to urge said gate yieldingly toward said slide-body, whereby said gate is adapted to hold said picture firmly against said slide-body and is also adapted to be moved away from said slide-body to permit ready insertion of said picture therebetween and withdrawal therefrom; said slide being adapted to be reciprocated lengthwise passed said light aperture and being further characterized by a rock-shaft having an arm to engage each of said post-heads, and having a finger extending away from the axis of said rock-shaft, and said housing having a cam adapted to be engaged with said finger when said slide is moved past said light aperture, said cam and finger cooperating to rock said shaft and cause said arm to open said gate positively, against the action of said spring, when said gate has been carried out of said housing by outward movement of said slide, said projector housing having a set of anti-friction rolls constituting a slideway for said slide, and a spring-actuated roll adapted to engage a portion of said slide, said slide-portion being provided with one or more recesses to be engaged yieldingly by said spring-actuated roll, whereby said slide is held in a selected position.

11. A negative-holding slide for projectors of the class described, said slide having a body portion provided with a ledge to support the negative, a swinging gate to hold the negative against said body portion, and an upright abutment at each end of the portion occupied by said negative, to guide the negative into position to be clamped by said gate.

12. A negative-holding slide as in claim 11 and further characterized by having one of said abutments lower than the other, to facilitate endwise introduction of the negative.

AUGUST D. EITZEN.